United States Patent
Xu et al.

(10) Patent No.: US 11,105,944 B2
(45) Date of Patent: Aug. 31, 2021

(54) SYSTEM AND METHOD FOR LATERAL STATISTICAL ESTIMATION OF ROCK AND FLUID PROPERTIES IN A SUBSURFACE FORMATION

(71) Applicant: Chevron U.S.A. Inc., San Ramon, CA (US)

(72) Inventors: Ellen Xiaoxia Xu, Houston, TX (US); Yuanbo Lin, Porter, TX (US); Ke Wang, Sugar Land, TX (US); Todd C. Dygert, Humble, TX (US); Morgan David Sullivan, Spring, TX (US); James P. Disiena, Houston, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 184 days.

(21) Appl. No.: 16/399,204

(22) Filed: Apr. 30, 2019

(65) Prior Publication Data

US 2020/0348433 A1 Nov. 5, 2020

(51) Int. Cl.
*G01V 1/30* (2006.01)
*G01V 1/34* (2006.01)

(52) U.S. Cl.
CPC .............. *G01V 1/307* (2013.01); *G01V 1/34* (2013.01)

(58) Field of Classification Search
CPC ......... G01V 1/307; G01V 1/34; G01V 99/005
See application file for complete search history.

(56) References Cited

U.S. PATENT DOCUMENTS

| | | | |
|---|---|---|---|
| 6,980,940 B1 * | 12/2005 | Gurpinar | E21B 43/00 703/10 |
| 7,759,545 B2 | 7/2010 | Lowe et al. | |
| 7,759,546 B2 | 7/2010 | Scott | |
| 9,121,968 B2 | 9/2015 | Posamentier et al. | |
| 9,892,366 B2 * | 2/2018 | Gevirtz | E21B 47/00 |
| 2011/0002194 A1 * | 1/2011 | Imhof | G01V 1/32 367/53 |

(Continued)

OTHER PUBLICATIONS

Kumar et al., A model-based approach for integration analysis of well log and seismic data for reservoir characterization (Year: 2016).*

(Continued)

*Primary Examiner* — Mohammad K Islam
(74) *Attorney, Agent, or Firm* — Marie L. Clapp

(57) ABSTRACT

A method is described for estimating hydrocarbon reservoir attributes including obtaining a geophysical dataset and a geological dataset; obtaining a parameter model, the parameter model having been conditioned by training an initial parameter model using training data, wherein the geological data includes well data and the training data includes the well data; picking a surface in the geophysical dataset; assigning stratigraphic meaning to the at least one surface based on the geological dataset; identifying at least one region of interest on the at least one surface; generating statistical seismic attributes for the at least one region; identifying critical attributes among the statistical seismic attributes by applying the parameter model to generate response variable maps for the at least one region; and generating uncertainty maps for each of the critical attributes and for the response variables. The method may be executed by a computer system.

6 Claims, 3 Drawing Sheets

(56) References Cited

U.S. PATENT DOCUMENTS

| | | | |
|---|---|---|---|
| 2012/0253770 A1* | 10/2012 | Stern | G01V 11/00 |
| | | | 703/10 |
| 2016/0202370 A1 | 7/2016 | Wang et al. | |
| 2019/0113638 A1* | 4/2019 | Wahrmund | G01V 1/301 |
| 2020/0041692 A1* | 2/2020 | Schmedes | E21B 41/0092 |
| 2020/0088897 A1* | 3/2020 | Roy | G01V 1/50 |
| 2020/0160173 A1* | 5/2020 | Pandey | G06N 3/08 |
| 2020/0183041 A1* | 6/2020 | Denli | G01V 1/282 |

OTHER PUBLICATIONS

PCT International Search Report and Written Opinion, dated Jun. 29, 2020, issued in International Application No. PCT/IB2020/052786, filed on Mar. 25, 2020, 12 pages.

* cited by examiner

SYSTEM AND METHOD FOR LATERAL STATISTICAL ESTIMATION OF ROCK AND FLUID PROPERTIES IN A SUBSURFACE FORMATION

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

The disclosed embodiments relate generally to techniques for estimating rock and fluid properties in subsurface hydrocarbon reservoirs and, in particular, to a method of estimating lateral rock and fluid properties guided by seismic sedimentology patterns in order to better represent the subsurface reservoir so that hydrocarbons may be extracted.

BACKGROUND

Seismic exploration involves surveying subterranean geological media for hydrocarbon deposits. A survey typically involves deploying seismic sources and seismic sensors at predetermined locations. The sources generate seismic waves, which propagate into the geological medium creating pressure changes and vibrations. Variations in physical properties of the geological medium give rise to changes in certain properties of the seismic waves, such as their direction of propagation and other properties.

Portions of the seismic waves reach the seismic sensors. Some seismic sensors are sensitive to pressure changes (e.g., hydrophones), others to particle motion (e.g., geophones), and industrial surveys may deploy one type of sensor or both. In response to the detected seismic waves, the sensors generate corresponding electrical signals, known as traces, and record them in storage media as seismic data. Seismic data will include a plurality of "shots" (individual instances of the seismic source being activated), each of which are associated with a plurality of traces recorded at the plurality of sensors.

Recorded seismic data can be used to determine rock and fluid properties of the subsurface through methods developed for reservoir geophysics. Many of these methods focus on improving the vertical resolution of seismic measurements by turning a seismic reflection trace into something more like a log. Those methods have evolved from a rudimental integration of trace to constrained sparse spikes to simultaneous inversion and lately to geostatistical inversion. These methods have failed to recognize that the strength of surface geophysical measurements lies in its lateral dense sampling. To fully leverage the strength of surface geophysical measurements such as 3D seismic data, it is necessary to develop methods that act laterally.

The ability to define the location of rock and fluid property changes in the subsurface is crucial to our ability to make the most appropriate choices for purchasing materials, operating safely, and successfully completing projects. Project cost is dependent upon accurate prediction of the position of physical boundaries within the Earth. Decisions include, but are not limited to, budgetary planning, obtaining mineral and lease rights, signing well commitments, permitting rig locations, designing well paths and drilling strategy, preventing subsurface integrity issues by planning proper casing and cementation strategies, and selecting and purchasing appropriate completion and production equipment.

There exists a need for reservoir geophysics methods that leverage the lateral density of seismic data to better delineate and therefore manage production from hydrocarbon reservoirs.

SUMMARY

In accordance with some embodiments, a method of estimating reservoir attributes as a function of position in a subsurface volume of interest is disclosed that includes obtaining a geophysical dataset and a geological dataset; obtaining a parameter model, the parameter model having been conditioned by training an initial parameter model using training data, wherein the geological data includes well data and the training data includes the well data; picking a surface in the geophysical dataset; assigning stratigraphic meaning to the at least one surface based on the geological dataset; identifying at least one region of interest on the at least one surface; generating statistical seismic attributes for the at least one region; identifying critical attributes among the statistical seismic attributes by applying the parameter model to generate response variable maps for the at least one region; and generating uncertainty maps for each of the critical attributes and for the response variables.

In another aspect of the present invention, to address the aforementioned problems, some embodiments provide a non-transitory computer readable storage medium storing one or more programs. The one or more programs comprise instructions, which when executed by a computer system with one or more processors and memory, cause the computer system to perform any of the methods provided herein.

In yet another aspect of the present invention, to address the aforementioned problems, some embodiments provide a computer system. The computer system includes one or more processors, memory, and one or more programs. The one or more programs are stored in memory and configured to be executed by the one or more processors. The one or more programs include an operating system and instructions that when executed by the one or more processors cause the computer system to perform any of the methods provided herein.

BRIEF DESCRIPTION OF THE DRAWINGS

Like reference numerals refer to corresponding parts throughout the drawings.

DETAILED DESCRIPTION OF EMBODIMENTS

Described below are methods, systems, and computer readable storage media that provide a manner of estimating rock and fluid properties in a subsurface volume of interest.

These embodiments are designed to be of particular use for estimating rock and fluid properties laterally based on seismic data.

Reference will now be made in detail to various embodiments, examples of which are illustrated in the accompanying drawings. In the following detailed description, numerous specific details are set forth in order to provide a thorough understanding of the present disclosure and the embodiments described herein. However, embodiments described herein may be practiced without these specific details. In other instances, well-known methods, procedures, components, and mechanical apparatus have not been described in detail so as not to unnecessarily obscure aspects of the embodiments.

The present invention leverages the lateral density of seismic data by using a method of lateral statistical estimation of rock and fluid properties guided by seismic sedimentology. Within geophysics, seismic inversion, quantitative interpretation and rock properties from seismic (RPFS) share a common thread of predicting lithology in the subsurface from seismic data. In geology, seismic stratigraphy, seismic geomorphology and seismic sedimentology represent techniques for better understanding stratigraphic relationships and ultimately inferring environment of deposition and lithology in the subsurface. Previous methods have focused on the vertical dimension by mitigating the influence of seismic wavelets and improving the vertical resolution. The map view approach of seismic geomorphology and seismic sedimentology emphasize the true strength of the seismic data in lateral extent. Seismic geomorphology and sedimentology function as a guidance device for the present method.

Lateral statistical estimation of rock and fluid properties guided by seismic sedimentology is a method that robustly links geophysical measurements with genetically connected rock and fluid units. The geophysical measurements comprises sonic, elastic and electromagnetic properties such as seismic travel time, velocity, depth, amplitudes, frequency, phase, or even electromagnetic measurements and the like. The statistical estimation emphasizes on the lateral dimension but does not exclude the vertical dimension. Geological data such as stratigraphy, picks on wells, outcrops, or other concepts guide the range over which the statistical estimation is made. The estimation focuses on the relative contrasts between various genetically linked rock and fluid units. The statistical calculation of geophysical measurements can be used for estimation of petrophysical and geological properties such as porosity, net-to-gross, bed thickness, etc. The connection between geophysical and petrophysical properties can be made via a statistical learning (i.e., machine learning) method.

Figure 1:
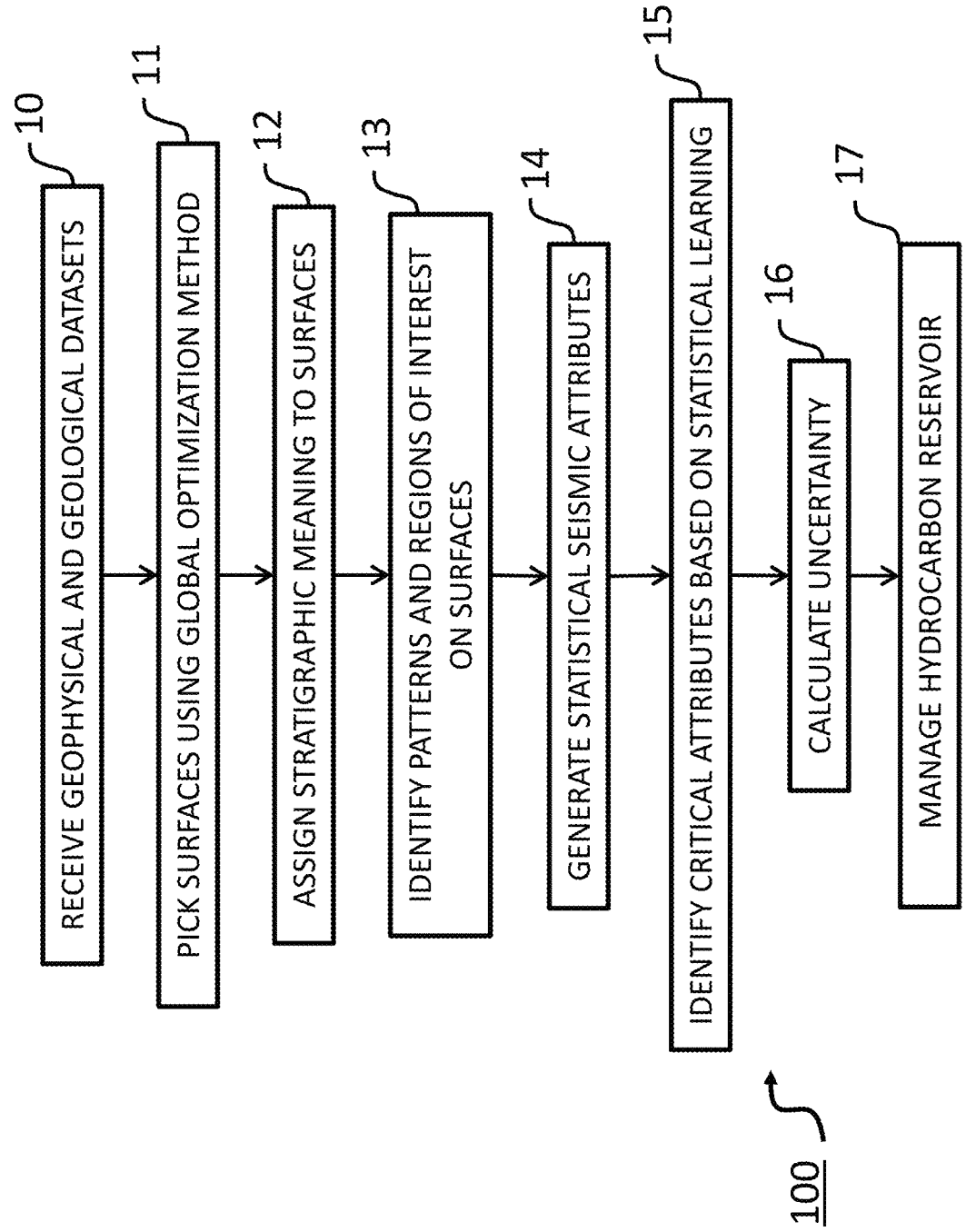
FIG. 1 illustrates a flowchart of a method of seismic imaging including horizon mapping, in accordance with some embodiments.

The present invention includes embodiments of a method and system for estimating lateral rock and fluid properties guided by seismic sedimentology. FIG. 1 illustrates a flowchart of a method 100 for estimating rock and fluid properties laterally. At operation 10, geophysical and geological datasets are received. The geophysical datasets include, for example, 2D or 3D seismic data recorded at the earth's surface above a subsurface volume of interest such as a hydrocarbon reservoir. The geophysical datasets may also include seismic data recorded in a well bore (i.e., vertical seismic profile). The geophysical measurements comprise sonic, elastic, and electromagnetic properties such as seismic travel time, velocity, depth, amplitudes, frequency, phase, or even electromagnetic measurements. The geological datasets may include any of well logs, well cores, outcrops, or geologic interpretations.

Figure 2:
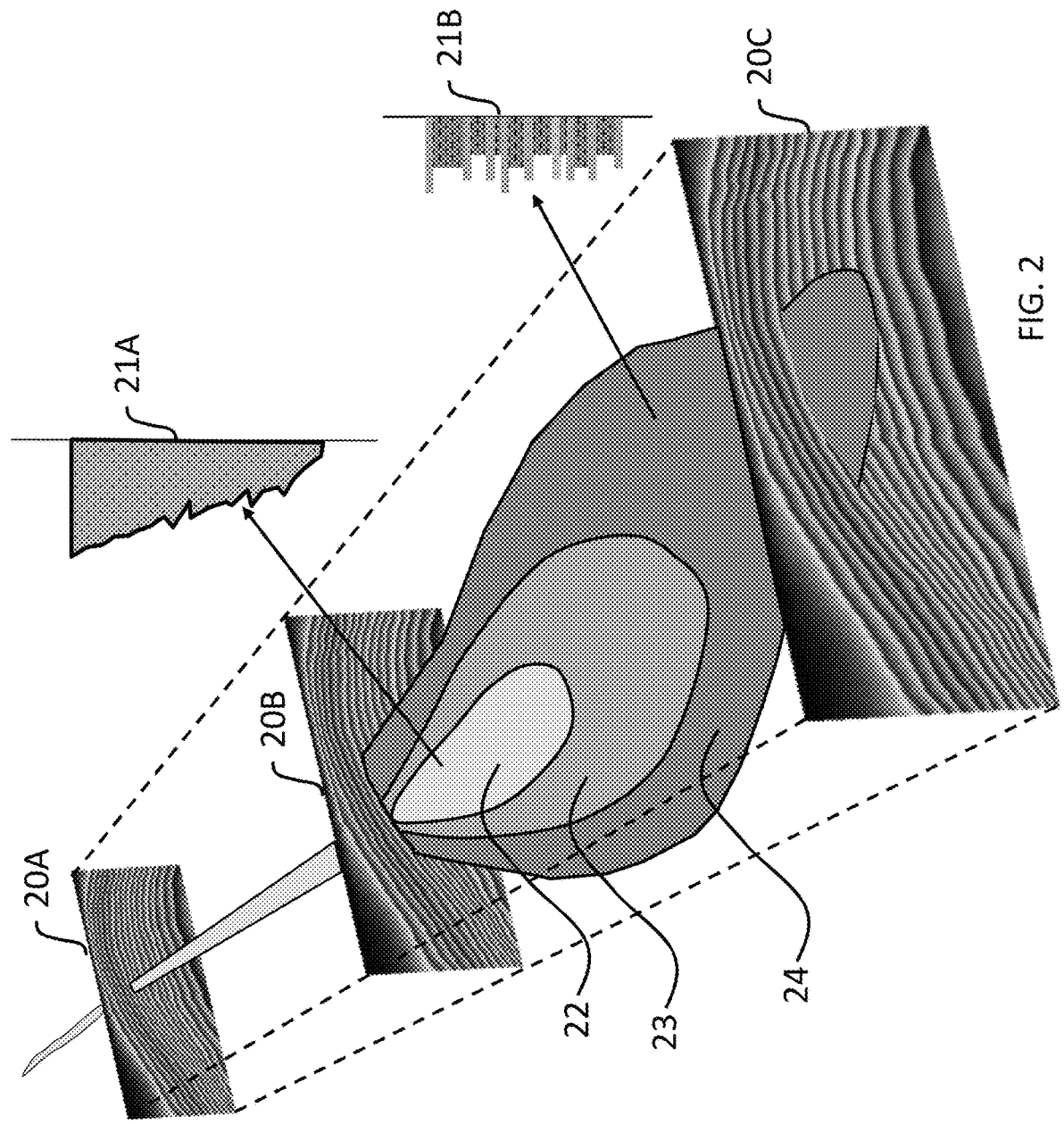
FIG. 2 is a representation of a subsurface structure as it corresponds to seismic geomorphology and sedimentology.

At operation 11, surfaces are picked in the seismic dataset, by way of example and not limitation, using a global optimization method. This method may act by flattening the seismic dataset on various reflectors, for example by using the method of U.S. Pat. Nos. 7,769,545, 7,769,546, and/or US Patent Application Publication 2016/0202370. One or more surfaces may be picked in the seismic dataset that correspond to a particular structure or stratigraphy of interest, such as those associated with a hydrocarbon reservoir. An extreme example of this step is a dense surface volume cross-referenced in US Patent Application Publication 2016/0202370, wherein every point in a seismic volume belongs to a surface, some of which are stratigraphically significant. As illustrated in FIG. 2, every color in the seismic sections 20A, 20B, and 20C represents a surface in a subterranean formation. The dark colored surface represents chronological surface of stratigraphy significance.

Once the surfaces are picked, operation 12 assigns stratigraphic meaning to the surfaces. The stratigraphic meaning may be determined based on tying the seismic to the geological datasets such as well logs. Some examples of stratigraphically significant surfaces include, by way of example and not limitation, Maximum Flooding Surfaces (MFS) or a Sequence Boundary. The reason those surfaces are important is because they represent an important chronological time period on which coeval sedimentology occurred. In other words, the patterns on those surfaces would reflect a sedimentology process and associated lithology distribution. An everyday example of such a surface could be the Mississippi delta where coarser sands are deposited in the channel and finer grains are deposited in the distal fan. The above emphasis of patterns on stratigraphically significant surfaces does not preclude pattern recognition via methods such as optical stacking or animation as referred in U.S. Pat. No. 9,121,968 B2. One can think of surfaces as a skeleton and seismic values between surfaces layer properties that are complimentary and an integral part of pattern recognition on surfaces and subsequent data analytics and machine learning.

At operation 13, one or more regions of interest on the surfaces is identified. These regions of interest may be selected based on the stratigraphic meanings of operation 12. For example, the regions of interest may be a proximal fan and a median fan while the distal fan may be less of an interest. The reverse could be true depending on if we are searching for conventional or unconventional reservoirs. Nonetheless, it is the contrast between regions that we are interested in. Alternatively, the region of interest may be identified based on the locations of the well bores and fluids (gas versus oil versus water) in its contained formation.

At operation 14, statistical seismic attributes are generated for the region(s) of interest. Seismic attributes may comprise of trace, texture or geometrical attributes. Seismic trace attributes may include, by way of example and not limitation, travel time, velocity, amplitudes, frequency, and phase. It is difficult to exhaust the hundreds of texture or geometrical seismic attributes proposed to date. The key is, however, to hinge the attributes and the selection of those on the geological patterns associated with the seismic stratigraphic surfaces. Using the aforementioned channel-proximal-distal-fan example (FIG. 2), with the channel 22, a velocity difference between the proximal fan 23 and distal fan 24 can be used to image the two different body of rocks. Likewise, as illustrated in the log schematics 21A and 21B, there may be frequency difference between these two body of rocks. Lateral statistical calculations of the relevant seismic attributes within each region would help imaging subsurface depositional environment and lithology distribution. Added benefits of lateral statistical calculation of seismic attributes are in combating low signal-to-noise ratio in sometimes challenged seismic data, leveraging the dense lateral sampling of the seismic data, and quantifying uncertainty associated with the seismic attributes.

At operation 15, critical attributes are identified based on statistical learning. The statistical learning operation may take as input a parameter model. The parameter model may be obtained from the non-transient electronic storage and/or other sources. The parameter model may be trained using training data on an initial parameter model. The training data may include well data from wells bored through the subsurface volume of interest. The parameter model may include random forest machine learning algorithm and/or other machine learning algorithms. Random forest machine learning algorithm may have a low risk of overfitting, may allow extreme randomization, and may be iterative. Random forest algorithm may be a modification of bootstrap aggregation that builds on a large collection of de-correlated regression trees and then averages them. Bootstrap aggregation may average many noisy but unbiased models to reduce prediction variance. Regression trees may be appropriate for bootstrap aggregation, because they can capture complex interaction structure. The random forest machine learning algorithm uses many bootstrap sets and many regression trees to generate many predictions, ultimately averaged together to provide the final prediction algorithm. This identifies the most impactful and statistically significant critical attributes with respect to some chosen response variable. Examples of a chosen response variable could be 12-month cumulative production or expected ultimate recovery. Maps of the chosen response variable and those critical attributes are generated for the formation of interest. This map would be the technical basis for business or operation decisions such as material acquisition, development prioritization, well placement, operation safety design and the like.

At operation 16, the uncertainty for each of the critical attributes is calculated. Maps of the uncertainty of the response variables are also generated. Since most of the machine learning leverages statics to calculate probability, the probability of a given response variable such as estimated ultimate recovery is a natural output.

At operation 17, the maps of the response variable and the uncertainty maps are used to manage the hydrocarbon reservoir. This may include decisions on material acquisition, development prioritization, well placement, well paths, injections, and production. In addition to the most-likely map of a given response variable, the P10 and P90 cases serve as the technical basis for decisions accommodating uncertainties.

In some embodiments, the method may further include correlating each of the critical attributes and response variables to generate a correlation plot and generating an impact ranking of the critical attributes to the response variable based on the correlation plot to generate a ranking seriatim. By way of example but not limitation, the correlation can take on the form of Pearson correlation for continuous variables or Spearman correlation for continuous or ordinal variables. The correlation and the subsequent seriatim can also be calculated as a partial dependence of the response to the dependent variable.

Figure 3:
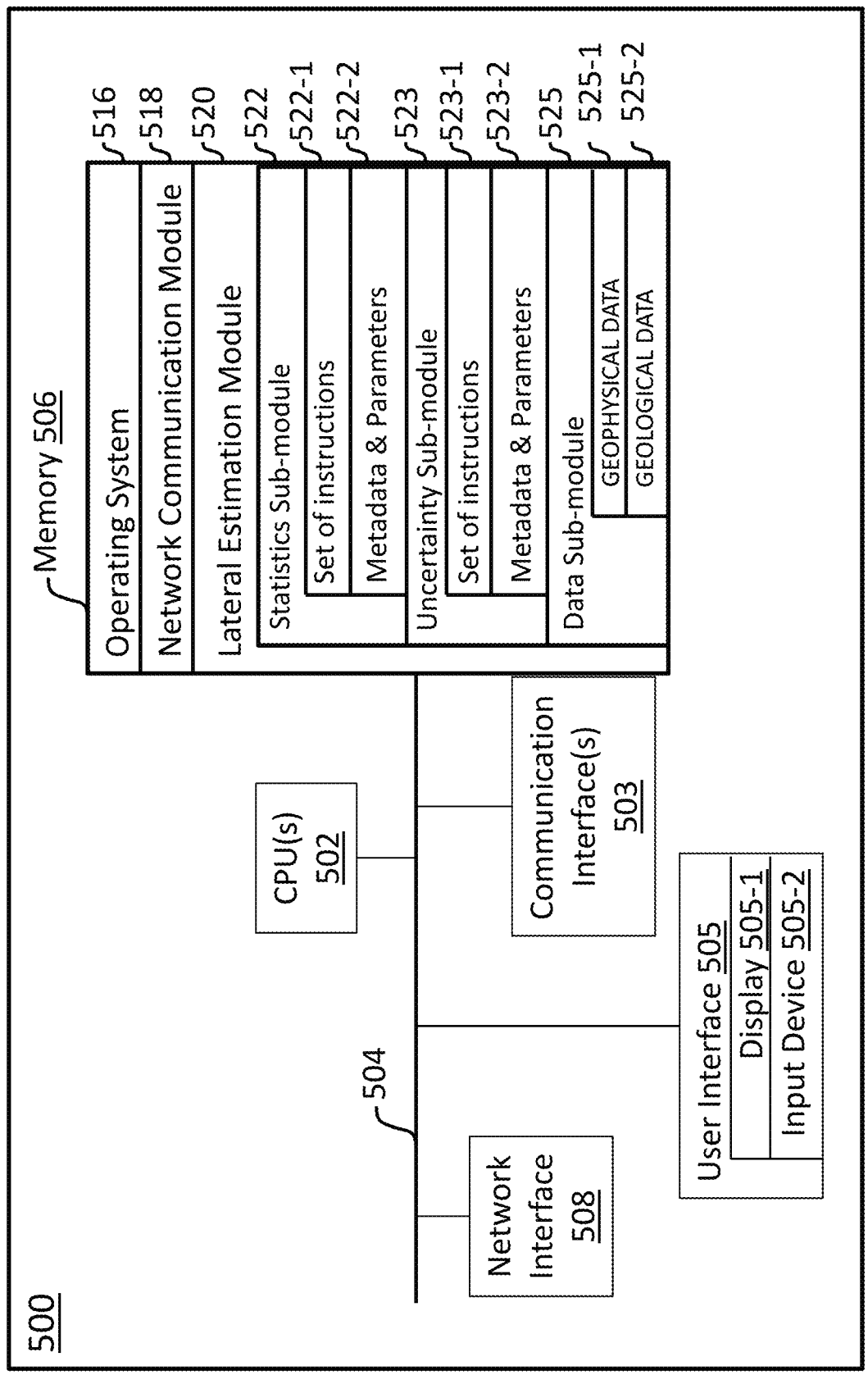
FIG. 3 is a block diagram illustrating a seismic imaging system, in accordance with some embodiments.

FIG. 3 is a block diagram illustrating a lateral estimation system 500, in accordance with some embodiments. While certain specific features are illustrated, those skilled in the art will appreciate from the present disclosure that various other features have not been illustrated for the sake of brevity and so as not to obscure more pertinent aspects of the embodiments disclosed herein.

To that end, the lateral estimation system 500 includes one or more processing units (CPUs) 502, one or more network interfaces 508 and/or other communications interfaces 503, memory 506, and one or more communication buses 504 for interconnecting these and various other components. The lateral estimation system 500 also includes a user interface 505 (e.g., a display 505-1 and an input device 505-2). The communication buses 504 may include circuitry (sometimes called a chipset) that interconnects and controls communications between system components. Memory 506 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 506 may optionally include one or more storage devices remotely located from the CPUs 502. Memory 506, including the non-volatile and volatile memory devices within memory 506, comprises a non-transitory computer readable storage medium and may store seismic data, well logs, core data, geologic interpretation models, and/or geologic structure information.

In some embodiments, memory 506 or the non-transitory computer readable storage medium of memory 506 stores the following programs, modules and data structures, or a subset thereof including an operating system 516, a network communication module 518, and a lateral estimation module 520.

The operating system 516 includes procedures for handling various basic system services and for performing hardware dependent tasks.

The network communication module 518 facilitates communication with other devices via the communication network interfaces 508 (wired or wireless) and one or more communication networks, such as the Internet, other wide area networks, local area networks, metropolitan area networks, and so on.

In some embodiments, the lateral estimation module 520 executes the operations of method 100. Lateral estimation module 520 may include data sub-module 525, which handles the geophysical data 525-1 and geological data 525-2. This data is supplied by data sub-module 525 to other sub-modules.

Statistics sub-module 522 contains a set of instructions 522-1 and accepts metadata and parameters 522-2 that will enable it to execute operations 11-15 of method 100. The uncertainty function sub-module 523 contains a set of instructions 523-1 and accepts metadata and parameters 523-2 that will enable it to execute operation 16 of method 100. Although specific operations have been identified for the sub-modules discussed herein, this is not meant to be limiting. Each sub-module may be configured to execute operations identified as being a part of other sub-modules, and may contain other instructions, metadata, and parameters that allow it to execute other operations of use in processing seismic data and generate the seismic image. For example, any of the sub-modules may optionally be able to generate a display that would be sent to and shown on the user interface display 505-1. In addition, any of the data or processed data products may be transmitted via the communication interface(s) 503 or the network interface 508 and may be stored in memory 506.

Method 100 is, optionally, governed by instructions that are stored in computer memory or a non-transitory computer readable storage medium (e.g., memory 506 in FIG. 3) and are executed by one or more processors (e.g., processors 502) of one or more computer systems. The computer readable storage medium may include a magnetic or optical disk storage device, solid state storage devices such as flash memory, or other non-volatile memory device or devices. The computer readable instructions stored on the computer readable storage medium may include one or more of: source code, assembly language code, object code, or another instruction format that is interpreted by one or more processors. In various embodiments, some operations in each method may be combined and/or the order of some operations may be changed from the order shown in the figures. For ease of explanation, method 100 is described as being performed by a computer system, although in some embodiments, various operations of method 100 are distributed across separate computer systems.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method of estimating reservoir attributes as a function of position in a subsurface volume of interest, the method being implemented in a computer system that includes one or more physical computer processors, non-transient electronic storage, and a graphical user interface, comprising:
   a. obtaining, from the non-transient electronic storage, a geophysical dataset and a geological dataset representative of a subsurface volume of interest;
   b. obtaining, from the non-transient electronic storage, a parameter model, the parameter model having been trained using training data, wherein the geological dataset includes well data of one or more wells in the subsurface volume of interest and the training data includes the well data;
   c. picking, with the one or more physical computer processors, at least one surface in the geophysical dataset;
   d. assigning stratigraphic meaning to the at least one surface based on the geological dataset;
   e. identifying at least one region of interest on the at least one surface;
   f. generating, with the one or more physical computer processors, statistical seismic attributes for the at least one region;
   g. identifying, with the one or more physical computer processors, statistically significant critical attributes among the statistical seismic attributes by applying the parameter model to generate response variable maps for the at least one region;
   h. generating, with the one or more physical computer processors, uncertainty maps of the at least one region for each of the critical attributes and uncertainty maps for the response variables; and
   i. displaying, via the graphical user interface, the response variable maps and the uncertainty maps.

2. The method of claim 1 further comprising using the response variable maps and the uncertainty maps to manage hydrocarbon production from the subsurface volume of interest.

3. The computer-implemented method of claim 1, wherein the parameter model comprises random forest machine learning.

4. The method of claim 1 further comprising:
   a. correlating, with the one or more physical computer processors, each of the critical attributes and response variables to generate a correlation plot;
   b. displaying, via the graphical user interface, the correlation plot;
   c. generating, with the one or more physical computer processors, an impact ranking of the critical attributes to the response variables based on the correlation plot to generate a ranking seriatim; and
   d. displaying, via the graphical user interface, the ranking seriatim.

5. A computer system, comprising:
one or more physical computer processors;
memory; and
one or more programs, wherein the one or more programs are stored in the memory and configured to be executed by the one or more processors, the one or more programs including instructions that when executed by the one or more processors cause the system to:
   a. obtain, from non-transient electronic storage, a geophysical dataset and a geological data set representative of a subsurface volume of interest;
   b. obtain, from the non-transient electronic storage, a parameter model, the parameter model having been trained using training data, wherein the geological dataset includes well data of one or more wells in the subsurface volume of interest and the training data includes the well data;
   c. pick, with the one or more physical computer processors, at least one surface in the geophysical dataset;
   d. assign stratigraphic meaning to the at least one surface based on the geological dataset;
   e. identify at least one region of interest on the at least one surface;
   f. generate, with the one or more physical computer processors, statistical seismic attributes for the at least one region;
   g. identify, with the one or more physical computer processors, statistically significant critical attributes among the statistical seismic attributes by applying the parameter model to generate response variable maps for the at least one region;
   h. generate, with the one or more physical computer processors, uncertainty maps of the at least one region for each of the critical attributes and uncertainty maps for the response variables; and
   i. display, via the graphical user interface, the response variable maps and the uncertainty maps.

6. A non-transitory computer readable storage medium storing one or more programs, the one or more programs comprising instructions, which when executed by an electronic device with one or more processors and memory, cause the device to:
   a. obtain, from non-transient electronic storage, a geophysical dataset and a geological dataset representative of a subsurface volume of interest;
   b. obtain, from the non-transient electronic storage, a parameter model, the parameter model having been trained using training data, wherein the geological dataset includes well data of one or more wells in the subsurface volume of interest and the training data includes the well data;
   c. pick, with the one or more physical computer processors, at least one surface in the geophysical dataset;
   d. assign stratigraphic meaning to the at least one surface based on the geological dataset;
   e. identify at least one region of interest on the at least one surface;
   f. generate, with the one or more physical computer processors, statistical seismic attributes for the at least one region;
   g. identify, with the one or more physical computer processors, statistically significant critical attributes among the statistical seismic attributes by applying the parameter model to generate response variable maps for the at least one region;
   h. generate, with the one or more physical computer processors, uncertainty maps of the at least one region for each of the critical attributes and uncertainty maps for the response variables; and
   i. display, via the graphical user interface, the response variable maps and the uncertainty maps.

\* \* \* \* \*